United States Patent [19]

Nineuil

[11] Patent Number: 4,545,788
[45] Date of Patent: Oct. 8, 1985

[54] PROCESS AND APPARATUS FOR DISCHARGING AND DEGASSING A SLURRY FROM AN ATTACK TANK

[75] Inventor: Guy Nineuil, Bihorel, France

[73] Assignee: Rhone-Poulenc Chimie de Base, Courbevoie, France

[21] Appl. No.: 618,125

[22] Filed: Jun. 7, 1984

[30] Foreign Application Priority Data

Jun. 7, 1983 [FR] France .................... 83 09398

[51] Int. Cl.⁴ ............................................. B01D 19/00
[52] U.S. Cl. ........................................... 55/52; 55/201; 210/804; 210/521; 423/321 R
[58] Field of Search ............. 55/36, 52, 55, 159, 55/189, 199, 201; 210/96.1, 525, 188, 521, 522, 802, 535–539, 803, 804; 423/321 R

[56] References Cited

U.S. PATENT DOCUMENTS

| | | | |
|---|---|---|---|
| 2,772,234 | 11/1956 | Kelly | 210/525 |
| 2,889,929 | 6/1959 | Kivell | 210/525 |
| 3,182,799 | 5/1965 | Krofta | 210/521 |
| 3,416,889 | 12/1968 | Caldwell | 23/165 |
| 3,494,736 | 2/1970 | Carothers et al. | 423/321 R X |
| 3,666,108 | 5/1972 | In 't Veld | 210/535 X |
| 4,338,195 | 7/1982 | Treyssac | 210/521 |

FOREIGN PATENT DOCUMENTS

| | | |
|---|---|---|
| 465486 | 9/1928 | Fed. Rep. of Germany . |
| 0778747 | 7/1957 | United Kingdom ............ 210/537 |

Primary Examiner—Charles Hart
Attorney, Agent, or Firm—Burns, Doane, Swecker & Mathis

[57] ABSTRACT

A slurry is discharged from an attack tank and degassed. At the top of the tank there is an overflow for discharging a first slurry portion. A container communicates with a pump. A receptacle is disposed between the overflow discharge and the container and comprises a downwardly inclined connecting surface for conducting the first slurry portion to the container. A conduit leads from the bottom of the tank and opens into the receptacle to combine a second slurry portion with the first slurry portion.

9 Claims, 3 Drawing Figures

PROCESS AND APPARATUS FOR DISCHARGING AND DEGASSING A SLURRY FROM AN ATTACK TANK

BACKGROUND OF THE INVENTION

Field of the Invention

The present invention concerns a process and an apparatus for discharging and degassing a slurry from an attack tank. This process and apparatus may be used more particularly in the production of phosphoric acid.

Many chemical processes are known, which involve a reaction resulting in the formation of a slurry of greater or lesser thickness, for example leaching treatments, or operations for attacking an ore by means of an acid, as is the case in particular with the acid attack on a phosphate ore in the wet-process preparation of phosphoric acid. In such processes, the slurry which was formed in a reaction vessel or an attack tank must be discharged and filtered in order to separate the required product from the by-product or by-products.

Therefore, for proper operation of the process, it is necessary to supply the material to the filter as regularly as possible and for that purpose to degass the slurry and to avoid any air being entrained therewith when it passes from the attack tank to the filter. In addition, it is advantageous to be able to feed to the filter a slurry which enjoys the maximum degree of homogeneity.

There are various processes and apparatus for transporting slurries from the attack tank to the filter. In particular, a discharge system is known which comprises an overflow at the top of the tank, the overflow opening directly and perpendicularly into a vertical container connected to a pump which draws-in the slurry and passes it to the filter. The disadvantage of such a system is that air is entrained when the slurry goes from the overflow into the container.

In addition, in such a case, the slurry is discharged only at a single point in the attack tank so that there is the danger that the slurry discharged from the tank may not be perfectly homogeneous with the remainder of the slurry in the attack tank.

SUMMARY OF THE INVENTION

The invention therefore seeks to provide a process and an apparatus which, irrespective of the operating conditions, permit both discharge of the slurry without air being entrained therewith, degassing of the slurry, and homogenization of the slurry.

For that purpose, the process according to the invention for discharging and degassing a slurry from an attack tank is characterized in that (i) a first portion of the slurry is discharged at the top of the tank by way of an overflow, (ii) a flow or stream of small thickness is formed with said slurry, (iii) said stream of slurry is caused to flow without an interruption therein into a container connected to a pump, and (iv) a second portion of the slurry is discharged at the bottom of the tank and is combined with said stream formed from the first portion of the slurry or with the slurry contained in the container.

In addition, an apparatus according to the invention for carrying out that process is of the type comprising, at the top of the tank, an overflow forming an overflow discharge, and a container which communicates with a pump into which passes the slurry coming from the overflow discharge. A receptacle is disposed between the overflow discharge and the container and comprises at least one connecting surface forming a smoothing or quieting means, situated between the overflow discharge and the container, over which surface the slurry flows, and a conduit which goes from the bottom of the tank and which opens into the receptacle or into the container.

The process and apparatus according to the invention enjoy a series of advantages.

Firstly, the formation of a flow or stream of slurry of small thickness gives rise to a small variation in the level in the tank in dependence on the slurry flow rate, and permits the residual gases included therein to be partially eliminated.

The flow configuration without any interruption in the stream of slurry, which is achieved by virtue of the structure of the receptacle, avoids any air being entrained with the slurry in the course of the flow thereof.

Moreover, discharging the slurry both at the top and at the bottom of the tank permits homogenization of the slurry. For example, when producing a phosphoric acid, and more particularly when the starting material is a sodium-bearing phosphate ore, it is possible to avoid or reduce the formation of balls of sodium fluosilicate. The balls have a tendency to be formed in the bottom of the attack tank and that, after a certain period of time, makes it necessary to stop the production process in order to remove the balls formed. Discharge of the slurry at the bottom of the tank makes it possible to remove the fluosilicate balls when they first begin to form.

THE DRAWING

The invention and other features, details and advantages thereof will be better appreciated from the following description with reference to the accompanying drawing in which.

DETAILED DESCRIPTION OF A PREFERRED EMBODIMENT OF THE INVENTION

Figure 1:
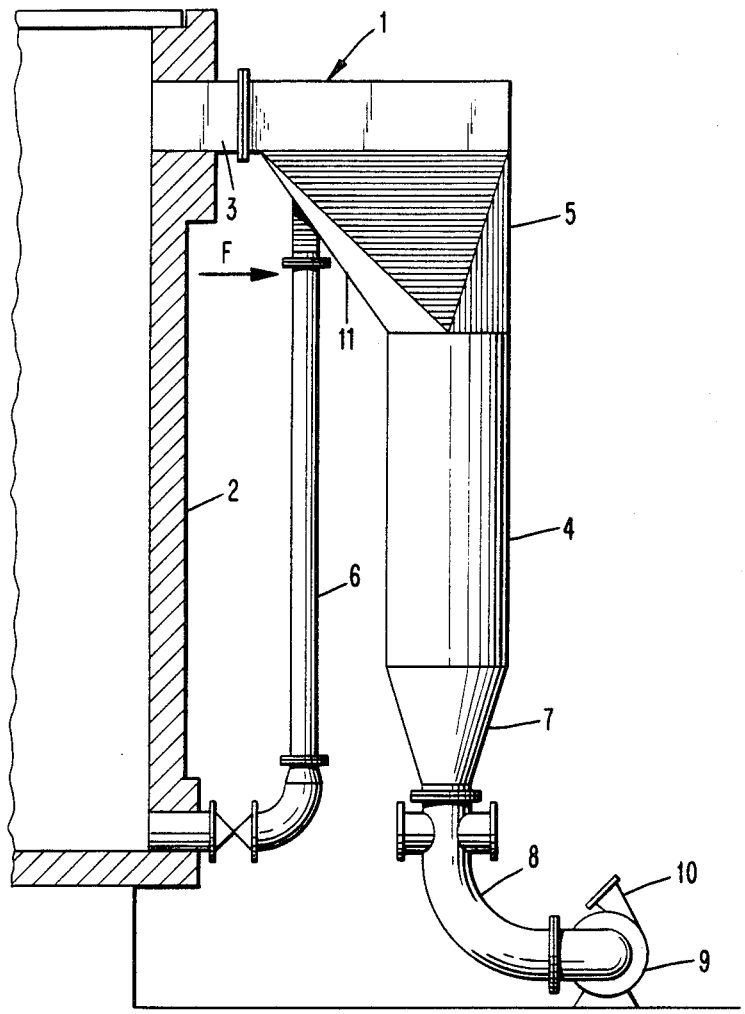
FIG. 1 is an elevational view of the apparatus according to the invention.
Figure 2:
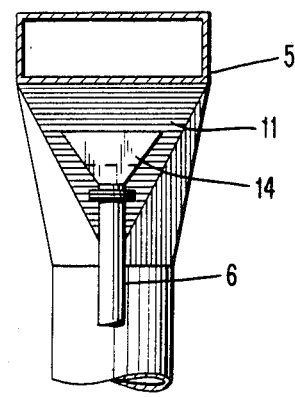
FIG. 2 is a side view along the arrow F in FIG. 1.

Referring to FIG. 1, shown therein, is an apparatus 1 according to the invention, disposed beside an attack tank 2.

The apparatus essentially comprises an overflow discharge 3, a slurry container 4, a receptacle 5 which is disposed between the overflow 3 and the container 4, and a conduit 6 which leads from the bottom of the tank and which, in the construction illustrated, opens into the receptacle 5.

The discharge 3 is a rectangular discharge which is therefore disposed at the top of the tank so as to form an overflow means. The dimensions of the discharge 3 are so calculated that a flow or stream of slurry of small thickness, for example about 10 cm, flows away therein. The length of the discharge 3 is so calculated as to be the minimum possible length in order to avoid any deposit of solid matter, for example gypsum in the case of phosphoric acid slurry.

In the embodiment illustrated, the container 4 is cylindrical. It is extended downwardly by a conical portion 7, a section of which at the bottom point is identical to a suction intake conduit 8 connecting the container-conical portion assembly to a pump 9. A discharge conduit 10 connects the pump to the system for distributing the slurry to the filter.

One of the main features of the invention is the receptacle 5 which permits the slurry to go from the discharge 3 to the container 4.

The receptacle 5 is in the form of a chest or casing which is mounted on the container and into which the overflow discharge opens. It comprises at least one connecting surface 11 forming a smoothing or quieting means over which the slurry flows and which connects the overflow discharge to the container or, more precisely, the surface of the overflow discharge over which the slurry flows, and/or a wall of the container. The expression "surface forming a smoothing or quieting means" is used herein to denote any surface which is disposed between the overflow discharge and the container and which fills-in or replaces the sharp angle which, without that surface, would be formed at the point at which the overflow discharge and the container meet.

The inclined connecting surface 11 may be of different forms. It may be curved such as a concave curved surface. As in the embodiment illustrated, it may be an inclined flat surface.

The connecting surface is bordered by two walls 12 and 13 of the receptacle, which thus define, with the connecting surface, a conduit through which the slurry flows.

In an alternative form of the invention, the walls which border the connecting surface are disposed in such a way that the connecting surface is of a width that decreases in the direction of flow of the slurry. That reduction in the width of the connecting surface makes it possible to maintain a substantially constant slurry flow rate in the receptacle.

Figure 3:
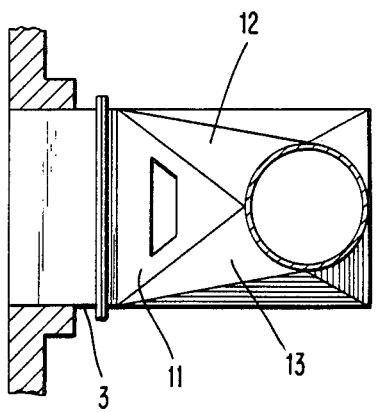
FIG. 3 is a plan view of the apparatus according to the invention.

A particular embodiment of the invention can be seen from FIGS. 1 and 3. In that embodiment, the connecting surface is formed by a triangle of which an apex lies on the upper end of the container with the opposite side lying on the edge of the overflow discharge. The two surfaces 12 and 13 are of an apparent triangular configuration, of which a base coincides with a portion of the circumference of the upper end of the container 4, with the apex opposite to that base lying on the edge of the overflow discharge. The other walls defining the receptacle are also triangular or of an apparent triangular configuration. The receptacle is therefore of an octagonal horizontal section which decreases in the direction of flow of the slurry.

Another main feature of the invention is the conduit 6. The conduit 6 may be of any section. It is so calculated as to be able to discharge a flow of slurry equivalent to about 30% to 50% of the total flow rate of slurry discharged.

The conduit 6 leads from the bottom of the tank or the vicinity thereof and it may terminate either in the receptacle or in the container. It is preferred for the conduit 6 to open into the receptacle and at the connecting surface thereof. In the latter case, it is advantageous for the arrangement to be such that the conduit opens into the receptacle by way of a flared connector 14 of rectangular cross-section.

The mode of operation of the apparatus according to the invention will be deduced from the foregoing description.

The slurry flows in the form of a stream of small thickness through the overflow discharge 3 and passes into the receptacle 5. Having regard to the surface 11 forming a smoothing or quieting means, the flow of slurry moves downwardly through the receptacle towards the container 4 without any interruption or separation or break-down in the flow of slurry, with the slurry then accumulating to a certain height in the container. The pump 9 draws-in the slurry through the conduit 8 and passes it for filtration by way of the conduit 10.

Having regard to the form of the receptacle which eliminates any risk of interruption or break-down of the flow of slurry and which limits the rate of flow of the slurry, no air is entrained while the slurry passes into the container and the degassing operation may be carried out in a suitable manner.

In addition, the slurry which is discharged by way of the conduit 6 is mixed with the flow of slurry from the overflow discharge 3.

Finally, the slurry which is collected in the container 4 is subjected to a final degassing operation at the top at the level of the surface thereof which is in contact with the air.

The process and apparatus according to the invention enjoy a series of advantages. Firstly, the formation of a flow of slurry of small thickness gives rise to a small variation in the level in the tank in dependence on the slurry flow rate, and permits the residual gases included therein to be partially eliminated.

The flow configuration without any interruption in the stream of slurry, which is achieved by virtue of the structure of the receptacle, avoids any air being entrained with the slurry in the course of the flow thereof.

Moreover, discharging the slurry both at the top and at the bottom of the tank permits homogenization of the slurry. For example, when producing a phosphoric acid, and more particularly when the starting material is a sodium-bearing phosphate ore, it is possible to avoid or reduce the formation of balls of sodium fluosilicate. The balls have a tendency to be formed in the bottom of the attack tank and that, after a certain period of time, makes it necessary to stop the production process in order to remove the balls formed. Discharge of the slurry at the bottom of the tank makes it possible to remove the fluosilicate balls when they first begin to form.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for discharging and degassing a slurry from an attack tank in the production of phosphoric acid, comprising the steps of:
    discharging a first slurry portion from an overflow at an upper part of the attack tank;
    conducting said discharged first slurry portion as a flow of small thickness without interruption along a downwardly inclined connecting surface and with a substantially constant flow rate into a container which communicates with a pump;
    discharging a second slurry portion from a lower part of the attack tank; and
    combining said second slurry portion with said flow of small thickness before said flow enters said container.

2. A process according to claim 1, wherein said second slurry portion comprises a flow of slurry equivalent to about 30% to 50% of the total flow of slurry discharged from the attack tank.

3. Apparatus for discharging and degassing a slurry from an attack tank in the production of phosphoric acid, comprising:

an overflow disposed at an upper part of said tank for discharging a first slurry portion;

a container for receiving a slurry;

a receptacle disposed between said overflow and said container, said receptacle including at least one downwardly inclined connecting surface for conducting the first slurry portion in an uninterrupted manner to said receptacle, said connecting surface having a decreasing width in the downstream direction;

a conduit communicating with a lower part of said tank and with and upper portion of said receptacle for conducting a second slurry portion from said lower tank part and combining same with said first slurry portion; and pump means for pumping said slurry from said container.

4. Apparatus according to claim 3, wherein said connecting surface is concave.

5. Apparatus according to claim 3, wherein said connecting surface is flat.

6. Apparatus according to claim 3, wherein said conduit communicates with said connecting surface.

7. Apparatus according to claim 6, wherein said conduit includes a flared connector of rectangular cross-section connecting said conduit to said connecting surface.

8. Apparatus according to claim 3, wherein said container is cylindrical and said connecting surface is of triangular shape and is arranged such that an apex of the triangle lies upon an upper end of said container and an opposite side of the triangle rests upon an edge of said overflow, said receptacle including two additional walls of triangular-shape and arranged such that a base of such additional triangles coincide with the circumference of said upper end of said container.

9. A process for discharging and degassing a slurry from an attack tank in the production of phosphoric acid, comprising the steps of:

discharging a first slurry portion from an overflow at an upper part of the attack tank;

conducting said discharged first slurry portion as a flow of small thickness without interruption and with a substantially constant flow rate along a downwardly inclined connecting surface having a decreasing width in the downstream direction, into a container which communicates with a pump;

discharging a second slurry portion from a lower part of the attack tank; said second slurry portion comprising a flow of slurry equivalent to about 30% to 50% of the total flow of slurry discharged from said attack tank; and combining said second slurry portion with said flow of small thickness along said connecting surface before said flow enters said container.

* * * * *